(12) United States Patent
Beck et al.

(10) Patent No.: US 11,591,972 B2
(45) Date of Patent: Feb. 28, 2023

(54) MECHANICAL GEARBOX FOR AIRCRAFT TURBOMACHINE

(71) Applicant: SAFRAN TRANSMISSION SYSTEMS, Colombes (FR)

(72) Inventors: Guillaume Julien Beck, Moissy-Cramayel (FR); Dhafer Ghribi, Moissy-Cramayel (FR); Simon Loïc Clément Lefebvre, Moissy-Cramayel (FR); Quentin Pierre Henri Pigott, Moissy-Cramayel (FR); Adrien Louis Simon, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 17/345,377

(22) Filed: Jun. 11, 2021

(65) Prior Publication Data
US 2021/0396184 A1 Dec. 23, 2021

(30) Foreign Application Priority Data

Jun. 11, 2020 (FR) ........................................ 2006092

(51) Int. Cl.
*F16H 55/08* (2006.01)
*F16H 1/28* (2006.01)
(Continued)

(52) U.S. Cl.
CPC ................. *F02C 7/36* (2013.01); *F16H 1/34* (2013.01); *F16H 55/08* (2013.01); *F05D 2220/323* (2013.01); *F05D 2260/40311* (2013.01)

(58) Field of Classification Search
CPC ... F02C 7/36; F16H 1/34; F16H 55/08; F16H 1/28; F16H 57/08; F05D 2220/323; F05D 2260/40311
See application file for complete search history.

(56) References Cited

U.S. PATENT DOCUMENTS

| | | | |
|---|---|---|---|
| 3,307,433 A | 3/1967 | Bennett et al. | |
| 3,640,150 A * | 2/1972 | Leiner | F16H 37/00 475/332 |

(Continued)

FOREIGN PATENT DOCUMENTS

| | | |
|---|---|---|
| EP | 3726031 A1 | 10/2020 |
| FR | 2987416 A1 | 8/2013 |

(Continued)

OTHER PUBLICATIONS

French Preliminary Report on Patentability dated Jan. 26, 2021, issued in corresponding French Application No. 2006092, filed on Jun. 11, 2020, 2 pages.

(Continued)

*Primary Examiner* — Tisha D Lewis
(74) *Attorney, Agent, or Firm* — Christensen O'Connor Johnson Kindness PLLC (57) ABSTRACT

A mechanical gearbox for an aircraft turbomachine includes a sun gear having an axis (X) of rotation, a ring gear around the sun gear, and planet gears meshed with the sun gear and the ring gear. Each planet gear has a first toothing meshed with the sun gear and a second loathing meshed with the ring gear. The first toothing includes a series of upstream teeth and a series of downstream teeth located on either side of a plane (H) perpendicular to the axis (X) of rotation of the sun gear. The second toothing includes a series of upstream teeth and a series of downstream teeth located on either side of the plane (H) and separated from one another by the first toothing, these teeth being parallel to one another and to the axis (Y) of rotation of the planet gear.

16 Claims, 8 Drawing Sheets

(51) Int. Cl.
  *F16H 57/08* (2006.01)
  *F02C 7/36* (2006.01)
  *F16H 1/34* (2006.01)

(56) References Cited

U.S. PATENT DOCUMENTS

| | | | | |
|---|---|---|---|---|
| 4,742,730 | A * | 5/1988 | Dorn | F16H 57/02 |
| | | | | 475/342 |
| 5,120,285 | A * | 6/1992 | Grimm | F16H 1/46 |
| | | | | 475/330 |
| 6,554,734 | B1 * | 4/2003 | Maydew | F16H 1/46 |
| | | | | 475/248 |
| 7,291,088 | B2 * | 11/2007 | Arndt | F16H 1/22 |
| | | | | 475/331 |
| 8,820,478 | B2 | 9/2014 | Gauthier et al. | |
| 8,876,647 | B2 | 11/2014 | Gallet et al. | |
| 10,233,998 | B2 | 3/2019 | Prunera-Usach et al. | |
| 10,323,576 | B2 | 6/2019 | Prunera-Usach et al. | |
| 10,458,279 | B2 | 10/2019 | Gedin et al. | |
| 2013/0172145 | A1 * | 7/2013 | Mourani | F16H 48/05 |
| | | | | 475/221 |
| 2017/0074356 | A1 * | 3/2017 | Webster | F02C 7/36 |
| 2020/0332721 | A1 | 10/2020 | Simon et al. | |

FOREIGN PATENT DOCUMENTS

| | | |
|---|---|---|
| FR | 3008462 A1 | 1/2015 |
| FR | 3008463 A1 | 1/2015 |
| FR | 3041054 A1 | 3/2017 |
| WO | 2010092263 A1 | 8/2010 |
| WO | 2013158179 A2 | 10/2013 |
| WO | 2013158179 A3 | 10/2013 |

OTHER PUBLICATIONS

French Written Opinion on Patentability of the Invention, issued in corresponding French Application No. 2006092, filed on Jun. 11, 2020, 5 pages.

* cited by examiner

MECHANICAL GEARBOX FOR AIRCRAFT TURBOMACHINE

CROSS-REFERENCE TO RELATED APPLICATION

This application claims priority under 35 U.S.C. § 119 to French Patent Application No. 2006092, filed Jun. 11, 2020, the disclosure of which is hereby incorporated by reference in its entirety.

FIELD

The present disclosure relates to the field of mechanical gearboxes for turbomachines, in particular for aircraft turbomachine.

BACKGROUND

The prior art comprises documents WO-A1-2010/092263, FR-A1-2 987 416, FR-A1-3 008 462, FR-A1-3 008 463, FR-A1-3 041 054, EP-A1-3 726 031 and U.S. Pat. No. 3,307,433.

The role of a mechanical gearbox is to modify the speed and torque ratio between the input shaft and the output shaft of a mechanical system.

The new generations of multi-flow turbomachines, especially those with a high bypass ratio, comprise a mechanical gearbox to drive the shaft of a propeller, for example a fan. Typically, the purpose of the gearbox is to transform the so-called fast rotational speed of the shaft of a power turbine into a slower rotational speed for the shaft driving the fan.

Such a gearbox comprises a central gear, called the sun gear, a ring gear and gears called planet gears, which are engaged between the sun gear and the ring gear. The planet gears are held by a frame called a planet carrier. The sun gear, the ring gear and the planet carrier are planetary gears because their axes of revolution coincide with the longitudinal axis X of the turbomachine. The planet gears have different axes of revolution evenly distributed on the same operating diameter around the axis of the planetaries. These axes are parallel to the longitudinal axis X.

There are several gearbox architectures. In the prior art of multi-flow turbomachines, the gearboxes are of the planetary or epicyclic type. In other similar applications, there are so-called differential or "compound" architectures.
  On a planetary gearbox, the planet carrier is fixed and the ring gear is the output shaft of the device which rotates in the opposite direction to the sun gear.
  On an epicyclic gearbox, the ring gear is fixed and the planet carrier is the output shaft of the device which rotates in the same direction as the sun gear.
  On a compound gearbox, no element is fixed in rotation. The ring gear rotates in the opposite direction to the sun gear and the planet carrier.

The gearboxes can be composed of one or more meshing stages. This meshing is achieved in different ways such as by contact, friction or magnetic fields. There are several types of contact meshing, such as straight, helical and herringbone toothing.

The increase in the reduction ratios of the architectures of the target engines leads to the use of so-called "double stage" gearboxes. Indeed, beyond a ratio of the order of 6 or 7, the so-called "single stage" technology loses its interest because it is no longer compact enough. In such applications, so-called "double stage" gearboxes are used.

In a single stage technology, the same toothing of a planet gear cooperates with the sun gear and the ring gear. In a double stage technology, the toothing of the planet gear that cooperates with the sun gear is different from the toothing of the planet gear that cooperates with the ring gear. In general, the toothing of a planet gear cooperating with the sun gear and the ring gear respectively have different average diameters.

The main problem with double stage gearboxes (each stage or toothing comprising a single set of teeth) lies in the fact that they are asymmetrical with respect to a plane perpendicular to the axis X. Thus, the power entering downstream from the inside and exiting upstream from the outside generates significant moments at the planet gears (the expressions "upstream" and "downstream" referring to the general flow of gases in the turbomachine).

One solution to this problem is to provide a symmetrical arrangement of the two toothing with respect to a plane perpendicular to the axis X (each stage or toothing comprising a double set of teeth). These two toothing are herringbone, i.e. they each comprise a series of upstream teeth separated axially from a series of downstream teeth. The upstream teeth are substantially parallel to each other and inclined with respect to the axis X. The downstream teeth are also substantially parallel to each other and inclined with respect to the axis X and with respect to the upstream teeth so that the upstream and downstream teeth form herringbones all around the planet gear. In a herringbone toothing, the helix angle of the two sets of teeth has the same value (and an opposite inclination), so that these sets of teeth generate opposite axial forces of the same value.

The upstream and downstream teeth of the toothing that cooperates with the sun gear are separated from each other by an annular groove. In the present technique, the upstream and downstream teeth of this toothing are symmetrical with respect to the aforementioned plane, which means that the imaginary lines passing through the apex of the upstream and downstream teeth and running along these apex intersect at points located in the plane of symmetry. This also means that an imaginary line passing through the apex of one of the upstream or downstream teeth respectively, passes through the apex of one of the downstream or upstream teeth respectively.

This configuration presents a disadvantage during the manufacture of the planet gear and in particular during the grinding of the teeth of its meshing toothing with the sun gear. This is because the grinding tool is moved over and/or between the teeth, in directions parallel to the teeth, and over the entire axial extent of the teeth. In order to prevent the tool from coming into contact with the downstream or upstream teeth respectively and damaging them when grinding the upstream teeth (or vice versa), it is necessary to oversize the axial groove between the teeth in order to allow the end of travel and the removal of the tool. This axial oversizing results in an increase in the axial dimensions of the planet gear and therefore of the gearbox, which is detrimental.

Another disadvantage of this symmetrical herringbone toothing technology is that an axial positioning is fixed by each of the teeth series pair, which has the effect of:
  either introducing potential overstressing into the gearbox, and thus to have to oversize it and thus end up with a larger and heavier gearbox; this has a major impact, especially when the number of planet gears is greater than 3, since the load distribution is then by nature less homogeneous between the planet gears, and there is therefore already a major overstressing factor to be taken into account linked to this phenomenon;

or imposing to leave the sun gear axially free, since at this point the axial position of the first stage is free, and the planet gears can align themselves axially with the position of the meshing toothing with the ring gear, which is itself fixed by the position of the ring gear; this is usually achieved by the use of splines able to axially slide to link the sun gear to its driving shaft; this connection presents risks of wear and can also introduce damping on the shaft for driving the sun gear, which has a negative effect on the dynamic behavior of the gearbox and the engine.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present disclosure relates to a mechanical gearbox for a turbomachine, in particular of an aircraft, this gearbox comprising:
- a sun gear having an axis of rotation,
- a ring gear which extends around the sun gear,
- planet gears which are meshed with the sun gear and the ring gear and which are held by a planet carrier, each planet gear having an axis of rotation and comprising a first toothing with a mean diameter D1 for meshing with the sun gear, and a second toothing with a mean diameter D2, which is different from D1, for meshing with the ring gear,
- the first toothing comprising a series of upstream teeth and a series of downstream teeth which are located on either side of a plane perpendicular to the axis of rotation of the sun gear and passing substantially through the middle of the planet gear,
- the second toothing comprising a series of upstream teeth and a series of downstream teeth located on either side of said plane and separated from each other by said first toothing,
- wherein the upstream teeth and the downstream teeth of the second toothing are parallel to each other and to the axis of rotation of the planet gear.

The parallelism of the upstream and downstream teeth of the second toothing means that these teeth are straight and not herringbone-shaped, contrary to the prior art.

The use of a straight toothing rather than herringbone toothing is advantageous in solving the above-mentioned problem concerning the axial overstressing of the planet gears. Indeed, the use of the straight toothing means that the axial position of the planet gear is not fixed by the second toothing and therefore limits the occurrence of overstressing, since the straight toothing allow an axial sliding. Thus, the planet gears can only be axially aligned with the sun gear. The axial position of the sun gear can therefore be fixed, which may allow to avoid using splines for the connection of the sun gear to its driving shaft, as these splines may wear and limit the service life of the gearbox.

The gearbox according to the present disclosure may comprise one or more of the following characteristics, taken in isolation from each other, or in combination with each other:
- the upstream teeth and the downstream teeth of the first toothing, and/or the upstream teeth and the downstream teeth of the second toothing, are angularly positioned about the axis of rotation of the planet gear so as to present a symmetry fault with respect to said plane; the teeth of the first toothing are thus not symmetrical with respect to the median plane of the planet gear which is perpendicular to the axis of rotation of the sun gear, contrary therefore to the prior art; this symmetry fault is useful for the step of rectifying the teeth referred to in the foregoing; in fact, with this symmetry fault, the risk of interaction between the grinding tool and a tooth is limited; when the tool is moved over or between the teeth of a first series (upstream or downstream), the tool reaches the inter-tooth groove and finds itself in front of an inter-tooth space and not in front of a tooth of the second series (downstream or upstream); the axial dimension of the inter-tooth groove, which serves to escape the grinding tool, can then be reduced accordingly, thus reducing the axial dimensions of the planet gear and thus of the gearbox;
- the first toothing is of the herringbone-tooth type, but could alternatively be straight; in the present application, a herringbone-tooth toothing means a toothing comprising two series of teeth oriented in different directions; the teeth of the first series are inclined with respect to the axis around which this first series extends, and the teeth of the second series are inclined differently with respect to this axis; the teeth of the two series are thus inclined with respect to each other to form herringbones; the helix angle of the two series of teeth has the same value and an opposite inclination;
- the upstream teeth and the downstream teeth of the first toothing each comprise an apex ridge and two lateral flanks, the upstream teeth and the downstream teeth of the first toothing being angularly positioned about the axis of rotation of the planet gear such that the apex ridge of each of the upstream teeth is located on an imaginary line that passes through one of the flanks of one of the downstream teeth;
- the upstream teeth of the first toothing are located at a pitch from each other, the downstream teeth of the first toothing are located at the same pitch from each other, the upstream teeth of the first toothing being angularly offset by half a pitch with respect to the downstream teeth of the first toothing about said axis of rotation of the planet gear; this offset allows to free up sufficient space for the grinding tool, since at the end of grinding, this tool is positioned opposite a hollow between two of the opposing teeth and therefore the series of teeth can be brought together without any risk of interference with the grinding tool; several millimeters can thus be saved on the axial dimensions of the planet gear and the gearbox;
- the upstream teeth and the downstream teeth of the first toothing are separated from each other by an annular groove located in said plane;
- the upstream teeth and the downstream teeth of the first toothing are parallel to each other and to the axis of rotation of the planet gear, and meet at the level of said plane;
- the ring gear comprises a toothing comprising series of upstream and downstream teeth located respectively on either side of said plane and separated from each other by the second toothing, the upstream and downstream teeth of the ring gear being parallel to each other and to the axis of rotation of the sun gear;

the sun gear comprises a toothing, preferably with herringbone teeth, comprising series of upstream and downstream teeth located respectively on either side of said plane;

the toothing of the sun gear is formed in one piece with a shaft for driving the sun gear;

the toothing of the sun gear is fitted and secured to a shaft for driving the sun gear, the driving shaft comprising external splines engaged in complementary internal splines of the sun gear;

an annular nut is screwed onto a free end of the shaft and bears axially on the sun gear to immobilize it axially on the shaft; the nut thus blocks the degrees of freedom of the sun gear with respect to the shaft;

the ring gear is configured to be rotationally immovable about said axis; and the planet carrier is configured to be rotationally movable about this axis;

the ring gear is configured to be rotationally movable about said axis; and the planet carrier is configured to be rotationally immovable about this axis.

The present disclosure further relates to a turbomachine, in particular of an aircraft, comprising a mechanical gearbox as described above.

DESCRIPTION OF THE DRAWINGS

The foregoing aspects and many of the attendant advantages of this present disclosure will become more readily appreciated as the same become better understood by reference to the following detailed description, when taken in conjunction with the accompanying drawings, wherein.

DETAILED DESCRIPTION

Figure 1:
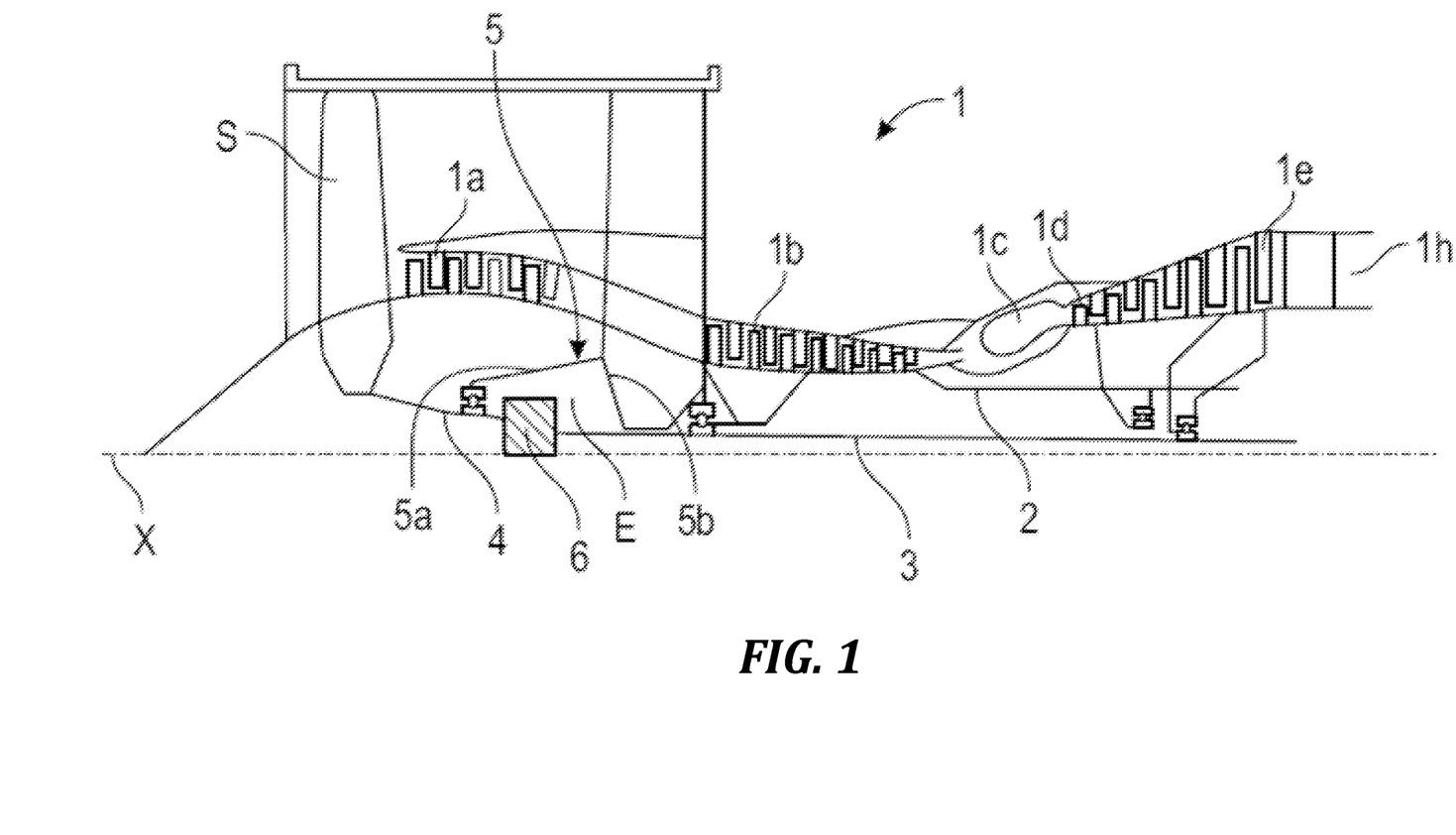
FIG. 1 is a schematic axial sectional view of a turbomachine according to a representative embodiment of the present disclosure.

FIG. 1 describes a turbomachine 1 which conventionally comprises a fan S, a low-pressure compressor 1a, a high-pressure compressor 1b, an annular combustion chamber 1c, a high-pressure turbine 1d, a low-pressure turbine 1e and an exhaust nozzle 1h. The high-pressure compressor 1b and the high-pressure turbine 1d are connected by a high-pressure shaft 2 and together form a high-pressure (HP) body. The low-pressure compressor 1a and the low-pressure turbine 1e are connected by a low-pressure shaft 3 and together form a low-pressure (LP) body.

The fan S is driven by a fan shaft 4 which is driven by the LP shaft 3 by means of a gearbox 6. This gearbox 6 is generally of the planetary or epicyclic type.

The following description relates to a gearbox of the epicyclic type, in which the planet carrier and the sun gear are rotationally movable, the ring gear of the gearbox being fixed in the engine reference frame.

The gearbox 6 is positioned in the upstream part of the turbomachine. A fixed structure comprising schematically, here, an upstream part 5a and a downstream part 5b which composes the engine casing or stator 5 is arranged so as to form an enclosure E surrounding the gearbox 6. This enclosure E is closed upstream by seals at the level of a bearing allowing the passage of the fan shaft 4, and downstream by seals at the level of the passage of the LP shaft 3.

Figure 2:
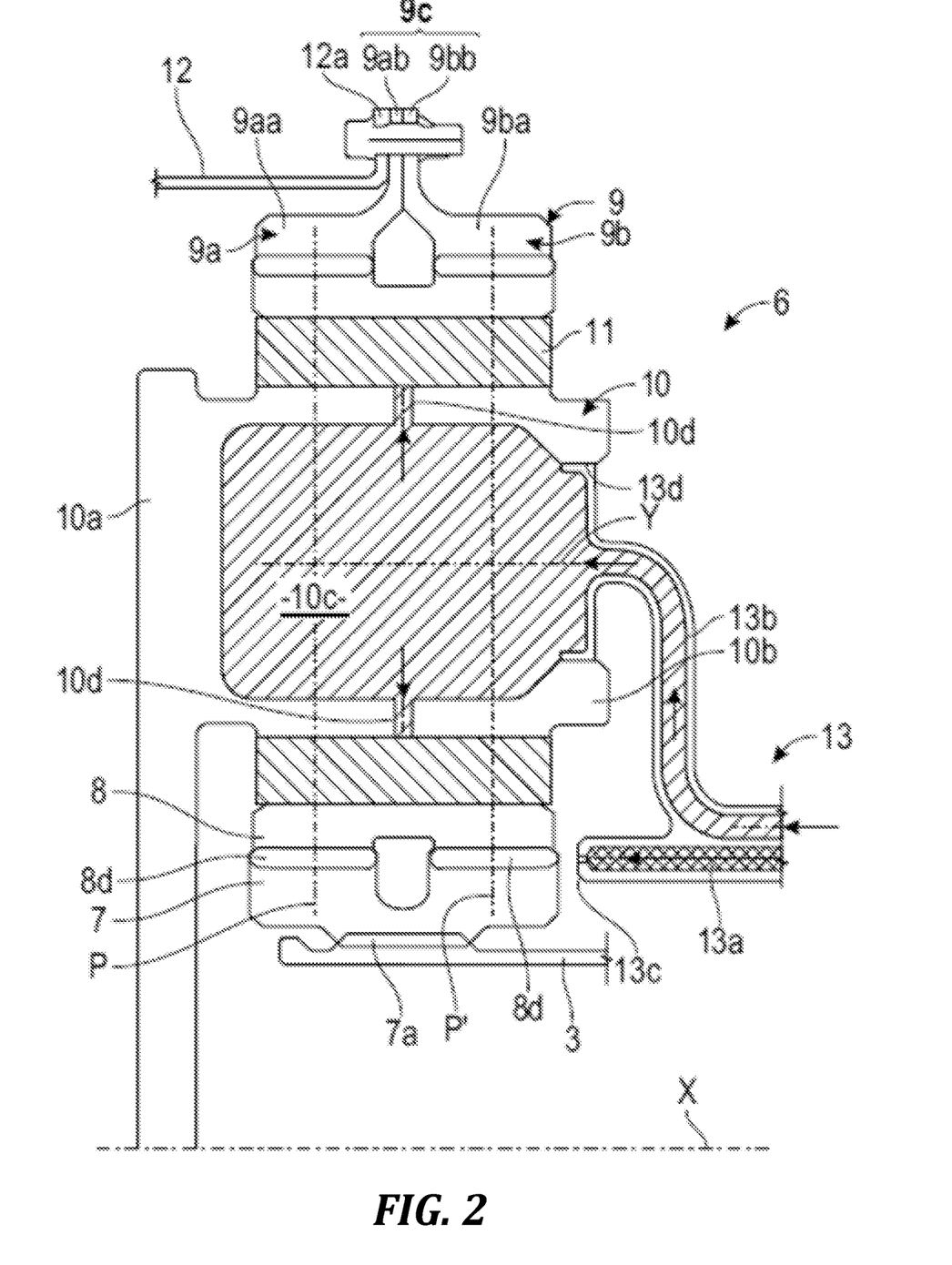
FIG. 2 is a partial axial sectional view of a single meshing stage mechanical gearbox.

FIG. 2 shows an epicyclic gearbox 6. On the input side, the gearbox 6 is connected to the LP shaft 3, for example via internal splines 7a. Thus, the LP shaft 3 drives a planetary gear called the sun gear 7. Classically, the sun gear 7, whose axis of rotation is coincident with that of the turbomachine X, drives a series of gears called planet gears 8, which are evenly distributed on the same diameter around the axis of rotation X. This diameter is equal to twice the operating center distance between the sun gear 7 and the planet gears 8. The number of planet gears 8 is generally defined between three and seven for this type of application.

The set of planet gears 8 is held by a frame called planet carrier 10. Each planet gear 8 rotates around its own axis Y, and meshes with the ring gear 9.

At the output are:

In this epicyclic configuration, the set of planet gears 8 rotates the planet carrier 10 around the axis X of the turbomachine. The ring gear is attached to the engine casing or stator 5 via a ring gear carrier 12 and the planet carrier 10 is attached to the fan shaft 4.

In another planetary configuration, the set of planet gears 8 is held by a planet carrier 10 which is attached to an engine casing or stator 5. Each planet gear drives the ring gear which is fitted to the fan shaft 4 via a ring gear carrier 12.

In another differential configuration, the set of planet gears 8 is held by a planet carrier 10 which is connected to a first fan shaft. Each planet gear drives the ring gear which is fitted to a second counter-rotating fan shaft via a ring gear carrier 12.

Each planet gear 8 is freely rotatably mounted by means of a bearing 11, for example a bearing or hydrodynamic bearing type. Each bearing 11 is mounted on one of the shafts 10b of the planet carrier 10 and all the axles are positioned relative to each other by means of one or more structural frames 10a of the planet carrier 10. There are a number of axles 10b and bearings 11 equal to the number of planet gears. For reasons of operation, assembly, manufacture, inspection, repair or replacement, the axles 10b and the frame 10a may be separated into several parts.

For the same reasons mentioned above, the toothing of a planet gear can be separated into several helixes or teeth having each a median plane P, P'. In our example, we detail the operation of a gearbox in which each planet gear comprises two series of herringbone teeth cooperating with a ring gear separated into two half ring gears:

An upstream half ring gear 9a comprising a rim 9aa and a fastening half-flange 9ab. On the rim 9aa is the front helix meshed with a helix of the toothing 8d of each planet gear 8. The helix of the toothing 8d also meshes with that of the sun gear 7.

A downstream half ring gear 9b comprising a rim 9ba and a fastening half-flange 9bb. On the rim 9ba is the rear helix meshed with a helix of the toothing 8d of each planet gear 8. The helix of the toothing 8d also meshes with that of the sun gear 7.

Although the helix widths vary between the sun gear 7, the planet gears 8 and the ring gear 9 because of the toothing overlapping, they are all centered on a median plane P for the upstream teeth and on another median plane V for the downstream teeth.

FIG. 2 thus illustrates the case of a single meshing stage gearbox, i.e. a same toothing 8d of each planet gear 8 cooperates with both the sun gear 7 and the ring gear 9. Even if the toothing 8d comprises two sets of teeth, these teeth have the same average diameter and form a single toothing called herringbone.

The fastening half-flange 9ab of the upstream ring gear 9a and the fastening half-flange 9bb of the downstream ring gear 9b form the fastening flange 9c of the ring gear. The ring gear 9 is attached to a ring gear carrier by assembling the fastening flange 9c of the ring gear and the fastening flange 12a of the ring gear carrier by means of a bolted assembly, for example.

The arrows in FIG. 2 describe the delivery of the oil in the gearbox 6. The oil enters the gearbox 6 from the stator 5 into a turbine stator 13 by various means which will not be specified in this view as they are specific to one or more types of architecture. The turbine stator 13 comprises injectors 13a and arms 13b. The function of the injectors 13a is to lubricate the toothing and the function of the arms 13b is to lubricate the bearings. The oil is supplied to the injector 13a and exits through the end 13c to lubricate the toothing. The oil is also supplied to the arm 13b and circulates through the supply inlet 13d of the bearing. The oil then flows through the axle into a buffer zone or buffer zones 10c and then out through the orifices 10d to lubricate the bearings of the planet gears.

Figure 3:
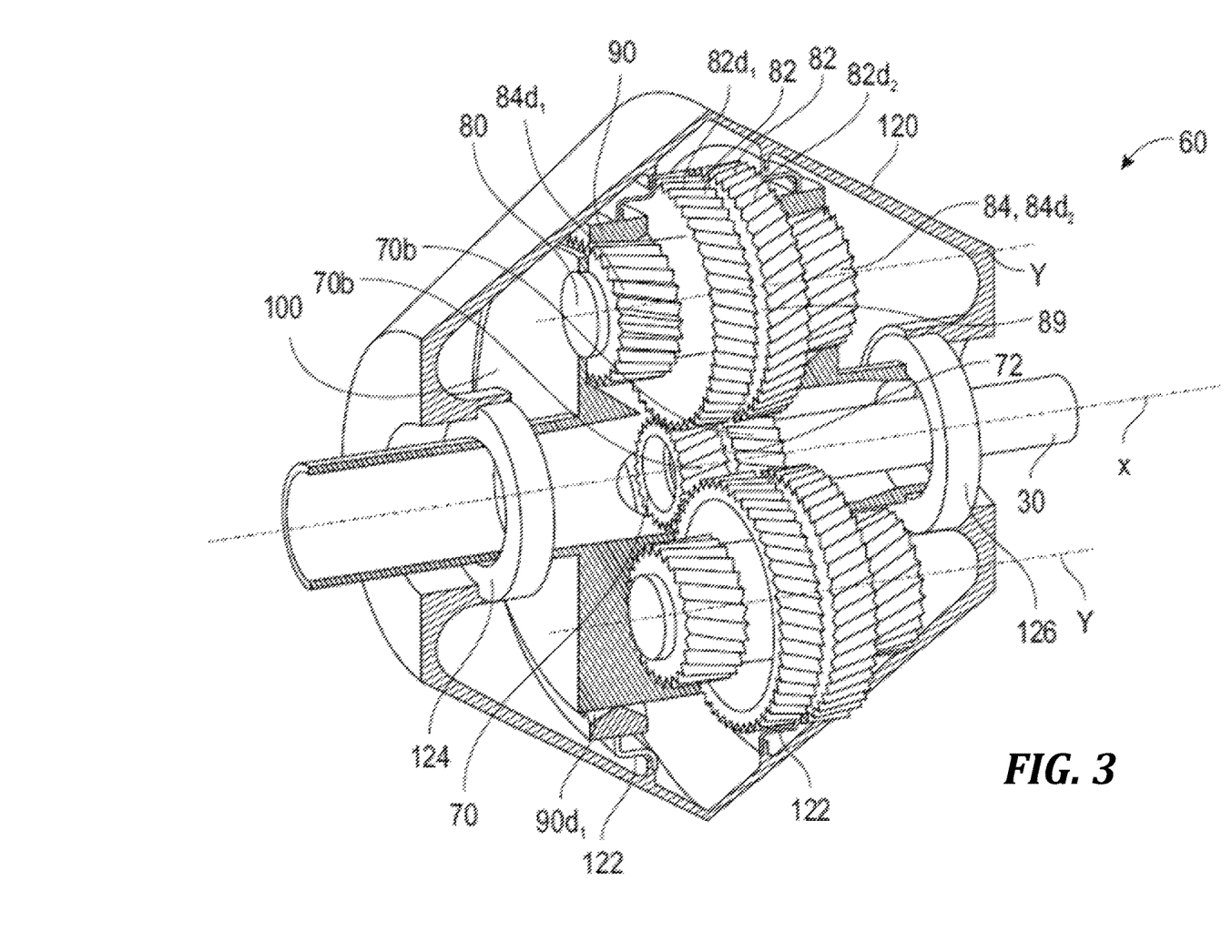
FIG. 3 is a partial axial sectional and perspective view of a double meshing stage mechanical gearbox.
Figure 4:
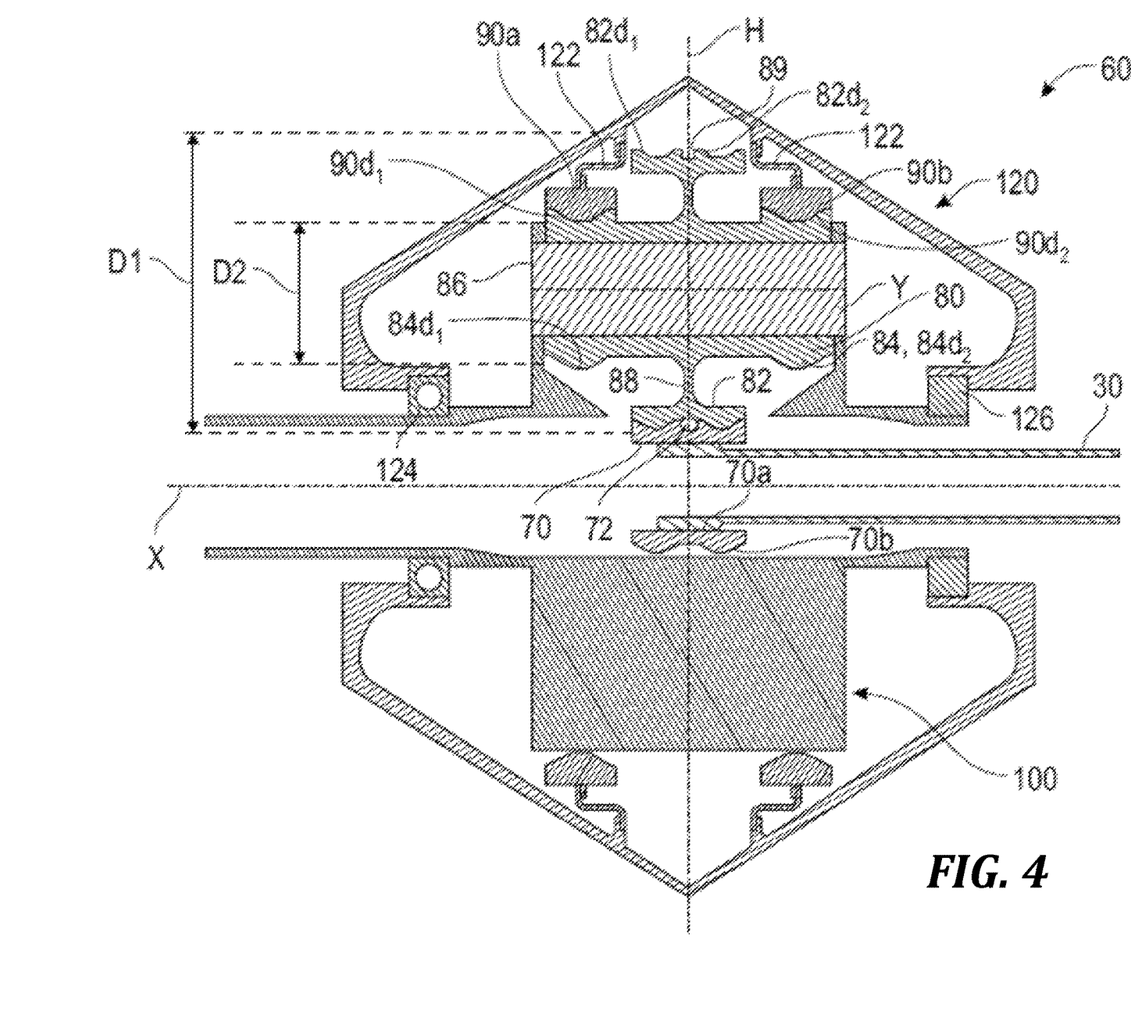
FIG. 4 is another schematic axial sectional view of the gearbox of FIG. 3.

FIGS. 3 and 4 show another example of gearbox architecture, known as a double meshing stage, which comprises:
 a sun gear 70 having an axis of rotation X,
 a ring gear 90 which extends around the sun gear and is configured to be rotationally immovable about the axis X, and
 planet gears 80 which are meshed with the sun gear 70 and the ring gear 90 and which are held by a planet carrier 100 which is configured to be rotationally movable about the axis X.

The plane H is defined as a median plane perpendicular to the axis X and passing substantially through the middle of the gearbox 60 (FIG. 4).

The sun gear 70 comprises internal splines 70a for coupling with the LP shaft 30 as well as an external toothing 70b for meshing with the planet gears 80. The toothing 70b have two series of adjacent herringbone-shaped teeth, separated from each other by an annular groove 72 oriented radially outwards. The toothing 70b is symmetrical with respect to the plane H, its teeth being located on either side of the plane H which passes through the groove 72.

The ring gear 90 is formed by two independent annulus 90a, 90b and comprises a toothing which is separated into two series of herringbone-shaped teeth 90d1, 90d2 beard respectively by the two annulus.

The annulus 90a, 90b are arranged symmetrically with respect to the plane H which thus extends between these annulus. The annulus are connected and secured to a ring gear carrier 120 by means of annular connecting shrouds 122. The shrouds 122 are independent of each other, each shroud having a general S-shape in axial half-section providing it a certain radial flexibility by elastic deformation during operation.

Each annulus 90a, 90b extends around the axis X and is secured to the corresponding shroud 122 by its outer periphery. Its inner periphery comprises one of the teeth 90d1, 90d2.

The ring gear carrier 120 has a generally annular shape around the axis X and is more particularly biconical. It thus comprises a first upstream section or on the left-hand in the drawing, with an upstream end of smaller diameter, and a downstream end of larger diameter which is connected to the upstream end of larger diameter of the other downstream section, or on the right-hand in the drawing. The larger diameter ends of the sections are thus connected to each other, and their smaller diameter ends form the axial ends of the ring gear carrier.

The upstream end of the ring gear carrier 120 extends around the planet carrier 100 or a shaft connected to the planet carrier, and is centered and rotatably guided on the planet carrier or the shaft by means of at least one bearing 124. Similarly, the downstream end of the ring gear carrier 120 extends around the planet carrier 100 or a shaft connected to that planet carrier, and is centered and rotatably guided on the planet carrier or the shaft via at least one additional bearing 126.

As is the case with the ring gear 90, the ring gear carrier 120 is symmetrical with respect to the plane H which intersects the ring gear carrier in its middle and thus passes through the ends of larger diameter of the aforementioned sections.

Each planet gear 80 comprises a first toothing 82 of average diameter D1 for meshing with the sun gear 70, and a second toothing 84 of average diameter D2, different from D1 and in particular smaller than D1, for meshing with the ring gear 90. The average diameters are measured from the axis Y of each planet gear and represent the average between the maximum diameter and the minimum diameter of a toothing of this planet gear.

Each planet gear 80 comprises a cylindrical body 86 and an annular web 88 extending substantially radially outwardly from the middle of the body 86. The toothing 84 is separated into two sets of herringbone teeth 84d1, 84d2 which are located respectively on the axial ends of the body 86. The toothing 82 comprises two series of herringbone teeth 82d1, 82d2 which are located at the outer periphery of the web 88 and which are separated from each other by an annular groove 89 opening radially outwards with respect to the axis Y.

The toothing 82 is passed through in its middle by the plane H which passes by the groove 89, the teeth 82d1, 82d2 therefore being arranged on either side of the plane H. The teeth 84d1, 84d2 are also arranged symmetrically with respect to the plane H.

The toothing 82 and the outer periphery of the web 88 have an axial dimension which is less than the axial distance between the annulus 90a, 90b, as well as between the shrouds 122, so that each planet gear 80 can rotate freely in the ring gear carrier 120 and between the annulus 90a, 90b and the shrouds 122.

Figure 5:
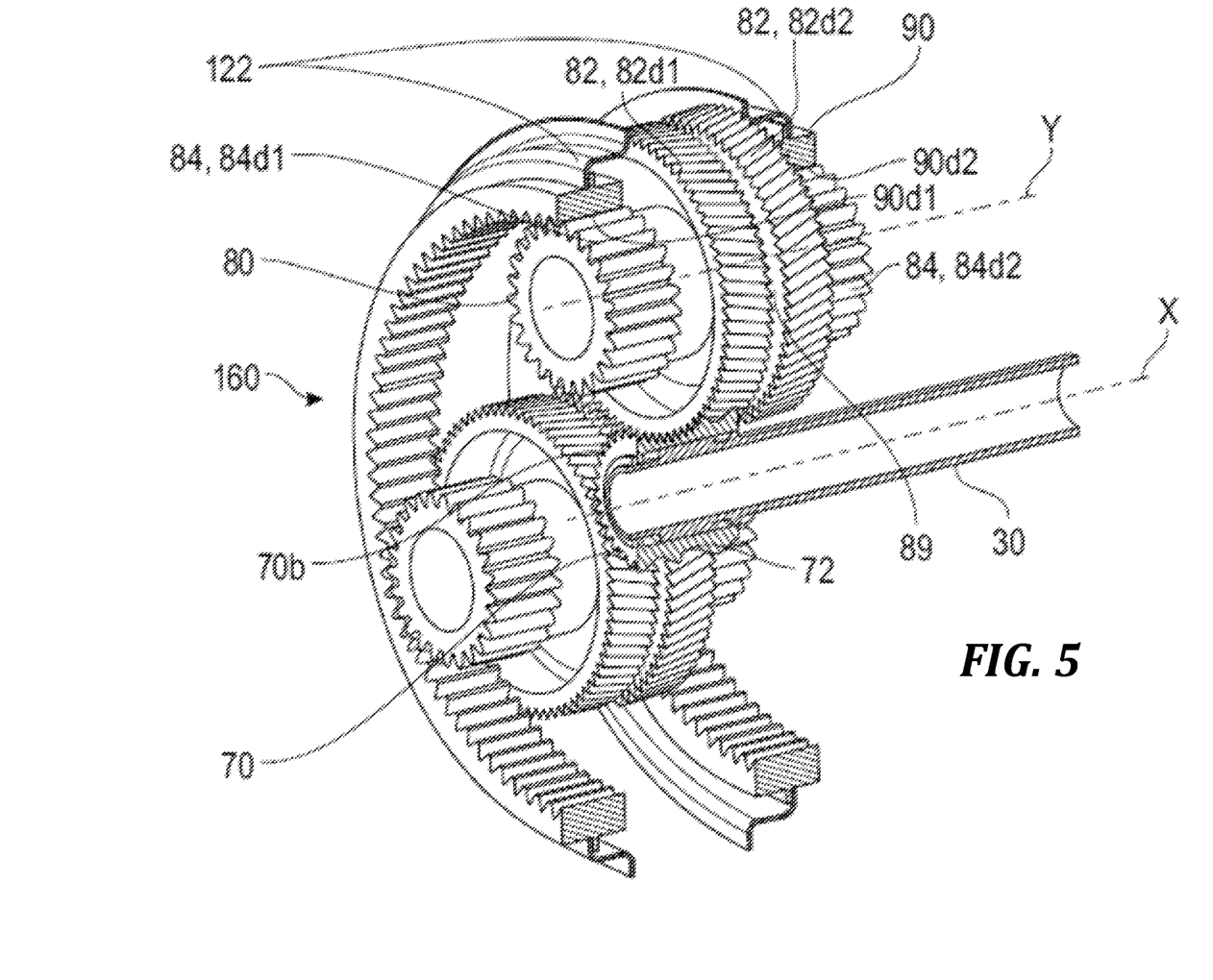
FIG. 5 is a partial axial sectional and perspective view of a double meshing stage mechanical gearbox according to a representative embodiment of the present disclosure.

This architecture presents some disadvantages which are resolved by the improvements made by the gearbox 160 according to the present disclosure, an embodiment of which is shown in FIG. 5.

The elements described in the foregoing in relation to FIGS. 3 and 4 are designated by the same references in FIG. 5. The foregoing description in relation to FIGS. 3 and 4 therefore applies to the embodiment of FIG. 5 insofar as it does not contradict or is not replaced by what follows.

A first improvement of the gearbox 160 relates to the teeth 82*d*1, 82*d*2 of the first toothing 82. This first toothing 82 is herringbone-shaped as in the gearbox 60 of FIGS. 3 and 4. However, unlike the gearbox 60 of FIGS. 3 and 4, the teeth 82*d*1, 82*d*2 of this toothing 82 are not symmetrical with respect to the plane H. On the contrary, the upstream teeth 82*d*1 are angularly offset about the axis Y with respect to the downstream teeth 82*d*2 in the gearbox 160 according to the present disclosure, as shown in FIG. 8.

Figure 6:
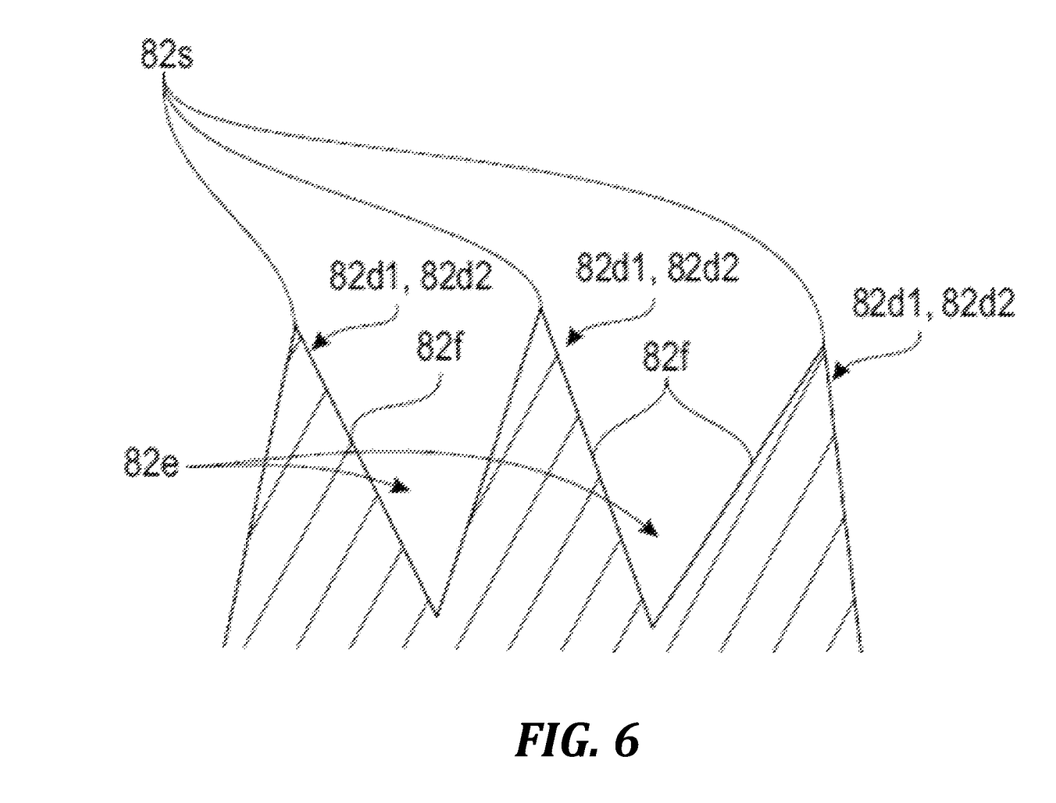
FIG. 6 is a schematic view of the teeth of one of the toothing of a gearbox planet gear.

FIG. 6 is a schematic representation of teeth 82*d*1, 82*d*2 of the toothing 82. Each tooth 82*d*1, 82*d*2 comprises an apex 82*s* having a generally straight ridge. Each tooth 82*d*1, 82*d*2 also comprises two side flanks 82*f* extending from the apex 82*s* or the apex ridge towards the inter-tooth spaces 82*e*. As schematically illustrated, each tooth 82*d*1, 82*d*2 is generally triangular or trapezoidal in cross-section.

Figure 8:
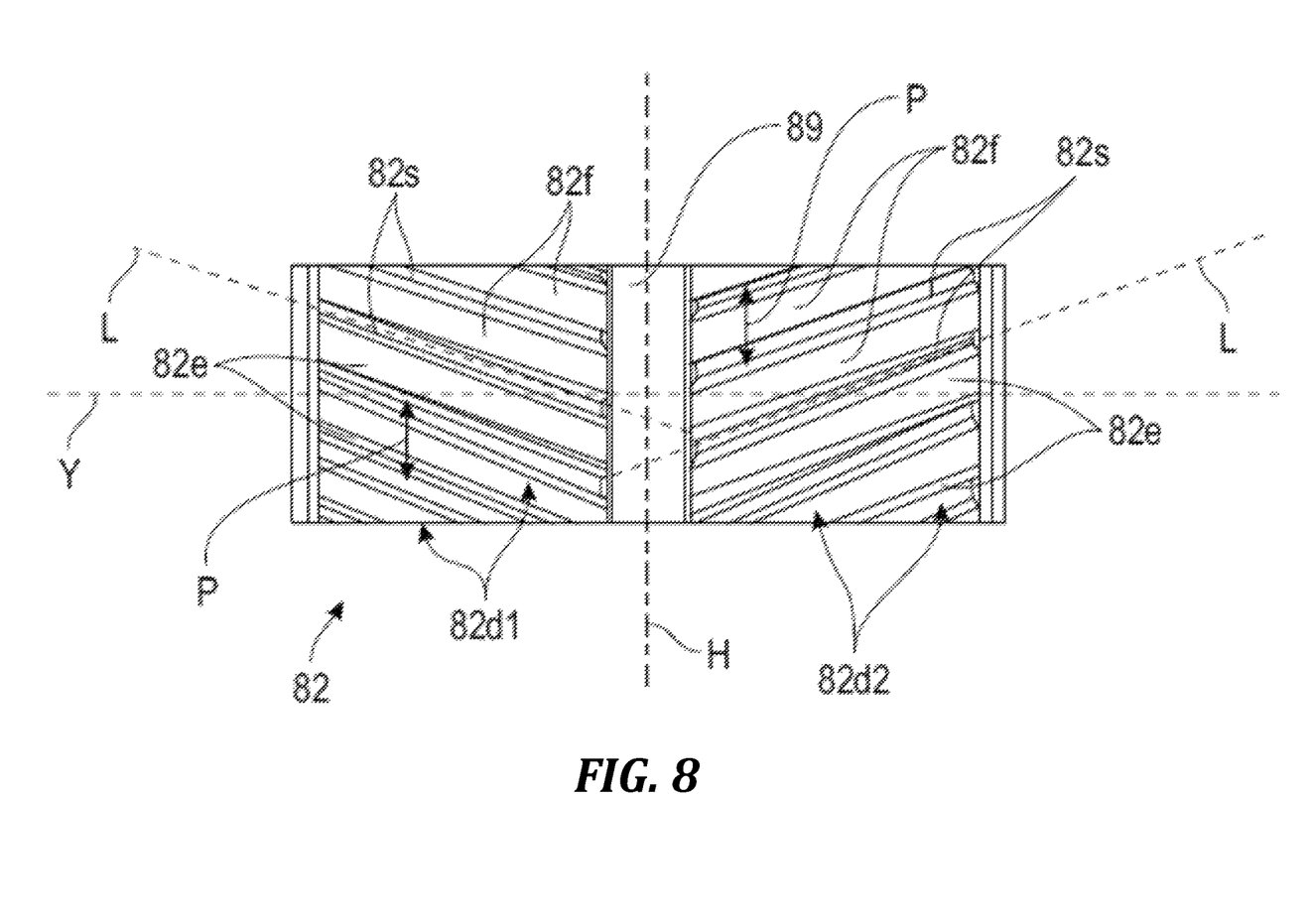
FIG. 8 is a schematic perspective view of a part of the first toothing of a planet gear of a gearbox according to a representative embodiment of the present disclosure.

The upstream teeth 82*d*1 and the downstream teeth 82*d*2 of the first toothing 82 are angularly positioned about the axis Y such that the apex ridge 82*s* of each of the upstream teeth 82*d*1 is located on an imaginary line L which passes through one of the flanks 82*f* of one of the downstream teeth 82*d*2 (see FIG. 8).

The upstream teeth 82*d*1 are located at a pitch P from each other. The downstream teeth 82*d*2 are located at a same pitch P from each other. The upstream teeth 82*d*1 are preferably angularly offset by half a pitch in relation to the downstream teeth 82*d*2 about the axis Y of rotation of the planet gear 80.

This offset frees up sufficient space for the grinding tool, since at the end of the grinding process, this tool is positioned opposite an inter-tooth space, hollow, or gap 82*e* between two adjacent teeth. It is therefore possible to bring the series of teeth 82*d*1, 82*d*2 closer together without the risk of interference with the grinding tool, by reducing the axial dimension of the groove 89 located between the series of teeth. This saves several millimeters on the axial dimensions of the planet gear 80 and the gearbox 160.

Another improvement of the gearbox 160 concerns the second toothing 84 which is no longer herringbone-shaped but is instead straight (see FIG. 5). This toothing 84 comprises upstream teeth 84*d*1 and downstream teeth 84*d*2 which are parallel to each other and to the axis Y of rotation of the planet gear 80. This second toothing 84 is therefore symmetrical with respect to the aforementioned plane H (which passes through the groove 89 and is perpendicular to the axis X), unlike the first toothing 82.

The use of a straight toothing 84 rather than a herringbone toothing is advantageous for solving the problem mentioned above concerning the axial overstressing of the planet gears 80. The use of the straight toothing 84 allows not to freeze the axial position of the planet gear 80 by this toothing 84 and thus to limit the occurrence of overstressing, since the straight toothing 84 allows axial sliding of the planet gear with respect to the ring gear 90.

Thus, the planet gears 80 can be axially aligned with the sun gear 70 only and the axial position of the sun gear can therefore be secured.

Figure 7:
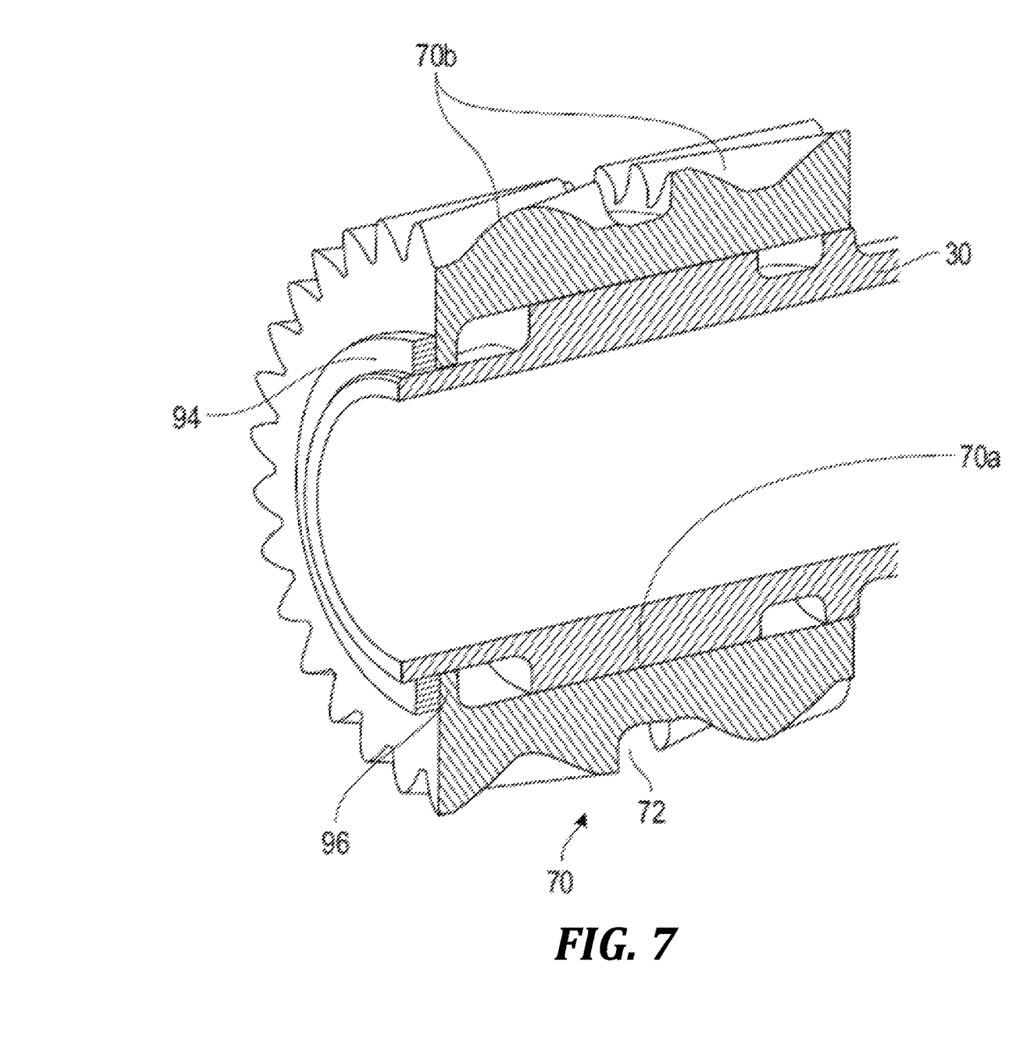
FIG. 7 is a larger scale view of a part of FIG. 6 and shows a mounting example of the sun gear on its driving shaft.

The sun gear 70, best seen in FIG. 7, comprises a toothing 70*b* with herringbone-teeth which is complementary to the toothing 82 of the planet gears 80 for the purpose of their meshing. This toothing 70*b* thus comprises upstream and downstream teeth located respectively on either side of the plane H and separated from each other by the groove 72. Due to the complementarity of this toothing 70*b* with the toothing 82 of the planet gears, the series of teeth of the toothing 70*b* also have a symmetry fault with respect to the plane H.

The sun gear 70 and its toothing 70*b* may be formed in one piece with the LP shaft 30. In the variant shown here, the sun gear 70 is fitted and secured to the LP shaft 30.

In this variant, the LP shaft 30 comprises external splines engaged in complementary internal splines 70*a* of the sun gear 70 and an annular nut 94 is screwed onto a free end of the LP shaft 30 and bears axially on the sun gear to immobilize it axially on the shaft. The sun gear 70 comprises, for example, an internal annular edge 96 which is clamped axially between the nut 94 and an annular shoulder (not shown) of the LP shaft 30. The nut 94 thus locks the degrees of freedom of the sun gear 70 relative to the LP shaft 30.

The ring gear 90 of the gearbox 160 is similar to that of the gearbox 60 except that the teeth 90*d*1, 90*d*2 of its toothing are straight and therefore parallel to each other and to the axis X.

The improvements mentioned above can be used independently of each other or in combination with each other. Other improvements are possible.

The teeth 84*d*1, 84*d*2 of the toothing 84 could be angularly offset from each other about the axis Y of each planet gear 80. This offset could be used alone or in combination with the offset of the teeth 82*d*1, 82*d*2 of the toothing 82.

In another alternative not shown of the gearbox according to the present disclosure, the toothing 82 of each planet gear 80 could also be straight. It is therefore understood that the toothing 70*b* of the sun gear would also be straight. The toothing 84 of each planet gear 80 could be straight, as mentioned above, or with herringbone teeth. In this configuration, the teeth 82*d*1, 82*d*2 of the straight toothing 82 could be separated from each other by the aforementioned groove 89 or they could meet at the level of the plane H.

The gearbox 160 according to the present disclosure is in particular compatible:

with an "epicyclic" use with rotating planet carrier and fixed ring gear;

with a "planetary" use with rotating ring gear and fixed planet carrier;

with a "differential" use with rotating ring gear and planet carrier;

with rolling element bearings and also hydrodynamic bearings;

with a one-piece or multi-part planet carrier.

While illustrative embodiments have been illustrated and described, it will be appreciated that various changes can be made therein without departing from the spirit and scope of the present disclosure.

The present application may also reference quantities and numbers. Unless specifically stated, such quantities and numbers are not to be considered restrictive, but representative of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed. Numerical ranges shall be interpreted to include the upper and lower bounds unless expressly stated otherwise.

The detailed description set forth above in connection with the appended drawings, where like numerals reference like elements, are intended as a description of various representative embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Generally, the embodiments disclosed herein are non-limiting, and the inventors contemplate that other embodiments within the scope of this disclosure may include structures and functionalities from more than one specific embodiment shown in the figures and described in the specification.

In the foregoing description, specific details are set forth to provide a thorough understanding of exemplary embodiments of the present disclosure. It will be apparent to one skilled in the art, however, that the embodiments disclosed herein may be practiced without embodying all the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "vertical," "horizontal," "front," "rear," "left," "right," "upper," "lower," "top," and "bottom," etc. These references, and other similar references in the present application, are intended to assist in helping describe and understand the particular embodiment (such as when the embodiment is positioned for use) and are not intended to limit the present disclosure to these directions or locations.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A mechanical gearbox for a turbomachine, comprising:
a sun gear having an axis (X) of rotation;
a ring gear which extends around the sun gear;
planet gears which are meshed with the sun gear and the ring gear and which are held by a planet carrier, each planet gear having an axis of rotation and comprising a first toothing with a mean diameter D1 for meshing with the sun gear, and a second toothing with a mean diameter D2, which is different from D1, for meshing with the ring gear,
wherein the first toothing comprises a series of upstream teeth and a series of downstream teeth which are located on either side of a plane (H) perpendicular to the axis (X) of rotation of the sun gear and passing substantially through a middle of the planet gear,
wherein the second toothing comprises a series of upstream teeth and a series of downstream teeth located on either side of said plane (H) and separated from each other by said first toothing,
wherein the upstream teeth and the downstream teeth of the second toothing are parallel to each other and to an axis (Y) of rotation of the planet gear,
wherein the ring gear is configured to be rotationally movable about the axis of rotation of the sun gear, and the planet carrier is configured to be rotationally immovable about the axis of rotation of the sun gear.

2. The mechanical gearbox according to claim 1, wherein at least one of the upstream teeth and the downstream teeth of the first toothing, or the upstream teeth and the downstream teeth of the second toothing, are angularly positioned about the axis (Y) of rotation of the planet gear so as to present a symmetry fault with respect to said plane (H).

3. The mechanical gearbox according to claim 2, wherein the first toothing is a herringbone tooth type.

4. The mechanical gearbox according to claim 3, wherein the upstream teeth and the downstream teeth of the first toothing each comprise an apex ridge and two lateral flanks, the upstream teeth and the downstream teeth of the first toothing being angularly positioned about the axis (Y) of rotation of the planet gear such that the apex ridge of each of the upstream teeth is located on an axis that passes through one of the flanks of one of the downstream teeth.

5. The mechanical gearbox according to claim 4, wherein the upstream teeth of the first toothing are located at a pitch (P) from each other, the downstream teeth of the first toothing are located at the same pitch (P) from each other, the upstream teeth of the first toothing being angularly offset by half the pitch (P) with respect to the downstream teeth of the first toothing about said axis (Y) of rotation of the planet gear.

6. The mechanical gearbox according to claim 1, wherein the upstream teeth and the downstream teeth of the first toothing are separated from each other by an annular groove located in said plane (H).

7. The mechanical gearbox according to claim 1, wherein the upstream teeth and the downstream teeth of the first toothing are parallel to each other and to the axis (Y) of rotation of the planet gear, and meet at said plane (H).

8. The mechanical gearbox according to claim 1, wherein the ring gear comprises a toothing comprising a series of upstream and downstream teeth located respectively on either side of said plane (H) and separated from each other by the second toothing, the upstream and downstream teeth of the ring gear being parallel to each other and to the axis (X) of rotation of the sun gear.

9. The mechanical gearbox according to claim 1, wherein the sun gear comprises a toothing comprising a series of upstream and downstream teeth located respectively on either side of said plane (H).

10. The mechanical gearbox according to claim 9, wherein the toothing of the sun gear is formed in one piece with a sun gear drive shaft.

11. The mechanical gearbox according to claim 9, wherein the toothing of the sun gear is fitted and secured to a shaft for driving the sun gear, the driving shaft comprising external splines engaged with complementary internal splines of the sun gear.

12. The mechanical gearbox according to claim 11, wherein an annular nut is screwed onto a free end of the shaft and bears axially on the sun gear.

13. A turbomachine comprising the mechanical gearbox according to claim 1, wherein the mechanical gearbox is connected to a low pressure shaft and to a fan shaft, the fan shaft being driven by the low pressure shaft by the mechanical gearbox.

14. A mechanical gearbox for a turbomachine, comprising:
- a sun gear having an axis (X) of rotation;
- a ring gear which extends around the sun gear; and
- planet gears which are meshed with the sun gear and the ring gear and which are held by a planet carrier, each planet gear having an axis of rotation and comprising a first toothing with a mean diameter D1 for meshing with the sun gear, and a second toothing with a mean diameter D2, which is different from D1, for meshing with the ring gear, wherein the first toothing comprises a series of upstream teeth and a series of downstream teeth which are located on either side of a plane (H) perpendicular to the axis (X) of rotation of the sun gear and passing substantially through a middle of the planet gear, wherein the second toothing comprises a series of upstream teeth and a series of downstream teeth located on either side of said plane (H) and separated from each other by said first toothing, wherein the upstream teeth and the downstream teeth of the second toothing are parallel to each other and to an axis (Y) of rotation of the planet gear, wherein at least one of the upstream teeth and the downstream teeth of the first toothing, or the upstream teeth and the downstream teeth of the second toothing, are angularly positioned about the axis (Y) of rotation of the planet gear so as to present a symmetry fault with respect to said plane (H).

15. A mechanical gearbox for a turbomachine, comprising:
- a sun gear having an axis (X) of rotation;
- a ring gear which extends around the sun gear; and
- planet gears which are meshed with the sun gear and the ring gear and which are held by a planet carrier, each planet gear having an axis of rotation and comprising a first toothing with a mean diameter D1 for meshing with the sun gear, and a second toothing with a mean diameter D2, which is different from D1, for meshing with the ring gear, wherein the first toothing comprises a series of upstream teeth and a series of downstream teeth which are located on either side of a plane (H) perpendicular to the axis (X) of rotation of the sun gear and passing substantially through a middle of the planet gear, wherein the second toothing comprises a series of upstream teeth and a series of downstream teeth located on either side of said plane (H) and separated from each other by said first toothing, wherein the sun gear comprises a toothing comprising a series of upstream and downstream teeth located respectively on either side of said plane (H), wherein the toothing of the sun gear is fitted and secured to a shaft for driving the sun gear, the driving shaft comprising external splines engaged with complementary internal splines of the sun gear, and wherein an annular nut is screwed onto a free end of the shaft and bears axially on the sun gear.

16. The mechanical gearbox according to claim 15, wherein the upstream teeth and the downstream teeth of the second toothing are parallel to each other and to an axis (Y) of rotation of the planet gear.

* * * * *